May 23, 1961 C. B. MALONEY 2,984,846
BOAT TRAILER HITCH
Filed Oct. 19, 1959
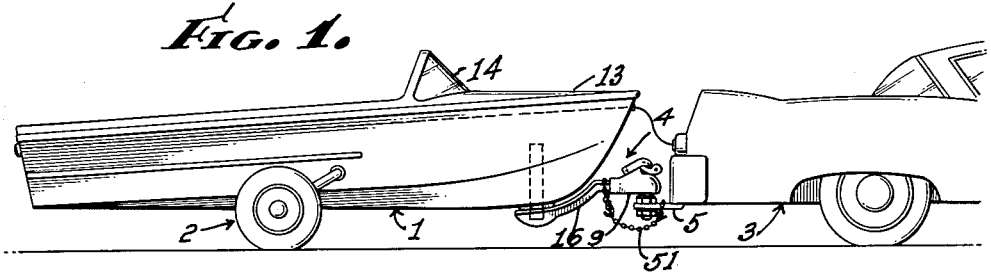
FIG. 1.
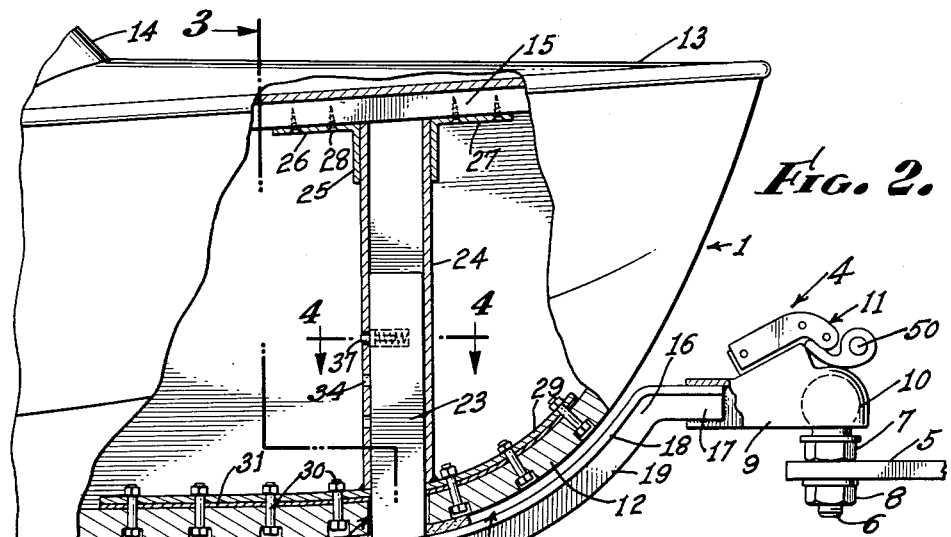
FIG. 2.
FIG. 3.
FIG. 4.
INVENTOR,
CLIFFORD B. MALONEY;
BY
Calvin Brown
ATTORNEY.

United States Patent Office 2,984,846
Patented May 23, 1961

2,984,846
BOAT TRAILER HITCH

Clifford B. Maloney, 638 Price St., Pomona, Calif.

Filed Oct. 19, 1959, Ser. No. 847,359

4 Claims. (Cl. 9—1)

The present invention relates to a hitch of a type which is adaptable for the hauling of a boat by means of a draft vehicle, such as an automobile. The transportation of trailers, boats and the like on the highway presents a hazard to other vehicles particularly if the trailer swings from side to side during movement or travels in an unstable manner relative to the draft vehicle.

The present invention contemplates use of a hitch construction for boats supported for rolling movement on a highway by means of a chassis of the type described in my Patent No. 2,865,031 entitled "Chassis for Trailers" issued December 23, 1958. In this patent I have described a chassis for boats or other trailers of a type which may be moved to a load supporting position to permit transportation of a boat on the highway, or wherein the chassis may be moved to a position above the boat keel and out of contact with the water. The construction of said patent lends itself admirably to the present hitch.

An object of my invention is to provide a hitch for interconnecting a boat trailer or other form of trailer to the draft vehicle in such a manner that any side sway or swing of the trailer relative to the draft vehicle, is substantially overcome or minimized.

A further object is the provision of a trailer hitch particularly adaptable for boats which may be connected to the bow of the boat in a positive manner and within a minimum of time and effort expended.

A further object is the provision of a trailer hitch specifically adaptable to a trailer having a two wheel chassis and wherein the hitch will support one end of the trailer, the two wheel chassis being used to support the trailer for movement over a road, the said hitch being formed to absorb road shock incident to release thereof from a draft vehicle.

A further object is the provision of a hitch for a trailer which is adjustable in height relative to the trailer.

A further object is the provision of a hitch for boats which is adaptable to large and small boats and which is specifically capable of elevating or lowering the bow of the boat to different heights above the roadway.

In the drawings:

Figure 1 is a fragmentary side elevation showing a boat, a draft vehicle and the improved hitch interconnecting the bow of the boat with the draft vehicle;

Figure 2 is a fragmentary, partially sectional view, on an enlarged scale, of the bow of a boat and showing the hitch connected to said bow;

Figure 3 is a fragmentary sectional view on the line 3—3 of Figure 2; and,

Figure 4 is an enlarged fragmentary sectional view on the line 4—4 of Figure 2.

Referring to the figures of the drawing, I have shown at 1 a boat provided with a wheeled chassis 2 whereby the boat may be towed on the highway through the medium of a draft vehicle such as an automobile 3 and a hitch designated generally as 4 which interconnects the draft vehicle 3 with the boat. The hitch 4 includes a draw bar 5, rigidly connected at one end to the framing of the draft vehicle 3. Usually the draw bar 5 is centered with reference to the transverse width of the vehicle and extends beyond the rear bumper thereof. The draw bar 5 in the present instance, is shown as carrying a ball headed bolt secured in any manner to the draw bar 5 such as by passing the bolt portion 6 through a transverse bore in the draw bar, and providing lock nuts 7 and 8 on the bolt shank on each side of the draw bar. The ball of the bolt is received in a socket portion of a member 9, as shown in dotted lines at 10. The particular hitch which includes the ball and socket members is conventional in the art and usually includes a locking device 11 carried by member 9 which interlocks with the ball member through the medium of a chain and padlock.

The boat 1, which is shown by way of illustration only, is of the type of pleasure craft seen on lakes, lagoons and the like and is of size which permits transportation over a roadway. While boat constructions differ, the boat has a stem 12 which connects with the keel in usual practice although this feature is not shown, and the bow is provided with a deck 13 and a windshield at 14. As a rule, the deck is formed of plywood or other material supported by transverse ribs which extend between sides of the hull. In the present instance there is provided a longitudinally extending beam 15 positioned on a medial line dividing the deck transversely and beneath the deck and which beam may be secured to the deck ribs or covering material.

The portion of the hitch which is detachably secured to the boat includes a draw bar 16, one end 17 of which is secured to the socket member 9, as shown in Figure 2. The draw bar is of T-shaped cross section having a top flange 18 and an intermediately positioned web 19. The draw bar is curved for a major length thereof and corresponds in curvature to the prow of the boat, as shown in Figure 2 at 20. The web 19 generally is of uniform width with the exception of a portion 21 which has a curved edge and has a greater width. The portion 21 acts as a support for the bow of the boat when the boat is not secured by the ball and socket members to the draw bar 5. The flange and the web are slotted at 22 to receive a post 23 which passes through the slot in the flange and into the slotted portion of the web. This post is held upright to the draw bar 16 in any convenient manner such as by welding. The post is substantially in right angle relationship to the portion 17 which connects with the socket member 9. In the present instance, the post is of rectangular cross section, as shown in Figure 4. In following the present trailer hitch construction, particularly for the boat shown, I secure a sleeve 24 between the stem 12 and beam 15. This sleeve is substantially in right angular relationship to the beam 15. To provide this construction, a rectangular cross sectioned tube 25 is used which is provided with oppositely positioned flanges 26 and 27, which flanges are secured to the lower surface of the beam 15 in any appropriate manner such as by screws, designated generally as 28, passed through transverse openings in the flanges and received within the beam 15. Preferably, the tube 25 is rigidly secured to the sleeve 24 such as by welding. The opposite end of the sleeve 24 is welded or otherwise secured to an elongated plate 29 fixedly secured to the stem 12. Plate 29 varies in width, as best shown in Figure 4, the greatest width being adjacent the connection with the sleeve 24. This plate is bolted to the stem in the manner shown in Figure 2 wherein both the plate and the stem are provided with matched holes in transverse spaced relationship and through which holes, bolts designated generally as 30, are passed and secured through the medium of the usual nuts. To render the holes, through which the bolts are passed, watertight, I provide a compression gasket 31 between the plate 29 and the inner surface of the stem 12. Stem 12, plate 29, and gasket 31 are provided with transverse bores or slots 32 in alignment with the bore of the sleeve 24. The post 23 is adapted to be passed through bores 32 for reception within sleeve 24 and to prevent any abrasive action between the draw bar 16 and particularly the flange 18 thereof with the stem of the boat, I have interposed therebetween a pad 33. The cross section of the sleeve corresponds with the cross section of the post and accordingly the sleeve is rectangular in the construction shown in Figure 4. The sleeve is provided with spaced holes, designated generally as 34, along one wall of the said sleeve. The post 23, inwardly from the upper end thereof, is provided with a transverse bore 35 within which is a coil spring 36 which urges a pin 37 to project outwardly from the post. Pin 37 is adapted to be received in any selected bore 34 and thereby regulates the telescopic extension of the post from the sleeve. In the boat construction, shown in Figure 1, and with particular reference to the wheeled chassis, the elevation of the bow above the roadway will, to an appreciable extent, depend upon the length of the boat so that the stern of the hull will not strike the roadway as the boat is drawn over the same. Consequently, it is desirable that the heights of the bow of the boat and the stern be substantially the same above the road, as shown in Figure 1.

By constructing the post 23 so as to be of rectangular form, or for that matter, any angle sided form, unless keying is resorted to, it is evident that there is no relative movement between the draw bar 16 and the post in its connection with the boat through the medium of the sleeve 24. The draw bar will not turn relative to the hull of the boat with the result that movement of the draw bar through the medium of the socket member 9 will produce like movement of the boat. For this reason, the hitch device of the present invention is very stable when hauling a trailer, in this instance a boat, over the road by means of a draft vehicle such as an automobile. As the draw bar 5 extends from the draft vehicle and is held against any swinging movement, any rotative movement between the draw bars 5 and 16 is through the ball and socket members. For this reason, the present hitch means permits stable movement of the boat relative to the draft vehicle without any appreciable side swing or wandering as the trailer follows the draft vehicle on the road.

The operation, uses and advantages of the invention are as follows.

If it is desired to secure the boat to the draft vehicle, the draw bar 16 with its associated socket member 9 is secured to the boat by passing the post 23 through the stem and into the sleeve 24 to an adjusted position, which position is maintained by the spring pressed pin 37 entering one of the holes 34. The socket member 9 is secured to the ball member 10 and the assembly locked in any approved manner such as by a chain passed through the eye 50 of member 11 and then passed around the draw bar 5 and locked in the usual manner, that is, by a padlock or by wrapping the chain and hooking the same. Another method of locking is shown in Figure 1 at 51. Upon reaching the site where the boat is to be moved into a body of water, the post 23 is removed from the sleeve 24 by removing the socket member 9 from the ball member 10 whereupon the boat may be moved into the water followed by a revolving of the wheeled chassis above the surface of the water. The hitch device of the present invention has been thoroughly tested on roads of varying roughness and at speeds as high as 80 miles per hour. In every instance the hitch is stable and without any appreciable swinging movement of the trailer.

I claim:

1. The combination of a boat having a curved prow and a hitch therefor, the hitch adapted for connection with a draft vehicle of: a draw bar curved longitudinally to conform to prow curvature, said draw bar provided with a curved foot for ground contact, a post secured to said draw bar contiguous to the curved foot, an upright sleeve within the boat and secured thereto, the curved prow provided with a slot in end alignment with the bore of the sleeve, the post adapted to be passed through the prow slot and telescopically received within the sleeve, means for spacing the draw bar from the prow of the boat and a ball and socket connection between the draft vehicle and the draw bar.

2. The combination with a boat having a curved prow and a hitch therefor, the hitch adapted for connection with a draft vehicle, of: a draw bar curved longitudinally to conform to prow curvature, said draw bar provided with a curved foot for ground contact, a post secured to said draw bar contiguous to the curved foot, an upright sleeve within the boat and secured thereto, the curved prow provided with a slot in end alignment with the bore of the sleeve, and the post adapted to be passed through the prow slot and telescopically received within the sleeve.

3. The device as set forth in claim 2, said post being substantially rectangular sectioned and the bore of the sleeve being complementary to the post section.

4. The construction as set forth in claim 2, and means for adjusting the telescopic relationship between the sleeve and the post.

References Cited in the file of this patent

UNITED STATES PATENTS

| | | |
|---|---|---|
| 2,171,889 | Payson | Sept. 5, 1939 |
| 2,515,564 | Mercer et al. | July 18, 1950 |
| 2,706,644 | Black | Apr. 19, 1955 |

FOREIGN PATENTS

| | | |
|---|---|---|
| 141,679 | Australia | June 19, 1951 |

UNITED STATES PATENT OFFICE
CERTIFICATE OF CORRECTION

Patent No. 2,984,846                                          May 23, 1961

Clifford B. Maloney

It is hereby certified that error appears in the above numbered patent requiring correction and that the said Letters Patent should read as corrected below.

In the grant, line 3, address of inventor, for "Pomona, California" read -- Pismo Beach, California --; in the heading to the printed specification, line 3, address of inventor, for "638 Price St., Pomona, Calif." read -- 638 Price St., Pismo Beach, Calif. --.

Signed and sealed this 12th day of December 1961.

(SEAL)

Attest:

ERNEST W. SWIDER                                            DAVID L. LADD

Attesting Officer                                                Commissioner of Patents

USCOMM-DC